(12) United States Patent
Saruta

(10) Patent No.: US 7,597,822 B2
(45) Date of Patent: Oct. 6, 2009

(54) BLUE PHOSPHOR AND DISPLAY PANEL USING THE SAME

(75) Inventor: Shoshiro Saruta, Sagamihara (JP)

(73) Assignee: Canon Kabushiki Kaisha, Tokyo (JP)

( * ) Notice: Subject to any disclaimer, the term of this patent is extended or adjusted under 35 U.S.C. 154(b) by 244 days.

(21) Appl. No.: 11/738,632

(22) Filed: Apr. 23, 2007

(65) Prior Publication Data

US 2007/0267600 A1    Nov. 22, 2007

(30) Foreign Application Priority Data

May 19, 2006    (JP) .............................. 2006-140879

(51) Int. Cl.
    C09K 11/59    (2006.01)
(52) U.S. Cl. .............. 252/301.4 F; 313/582; 313/584; 313/486; 313/467
(58) Field of Classification Search ........... 252/301.4 F; 313/582, 584, 486, 467
    See application file for complete search history.

(56) References Cited

U.S. PATENT DOCUMENTS

| | | | |
|---|---|---|---|
| 6,099,753 A | 8/2000 | Yoshimura et al. | 252/301.4 |
| 6,833,086 B2 | 12/2004 | Kajiwara | 252/301.6 |
| 6,899,825 B2 * | 5/2005 | Matsuda et al. | 252/301.4 F |
| 6,939,480 B2 | 9/2005 | Aoki et al. | |
| 2004/0080271 A1 | 4/2004 | Aoki et al. | |
| 2005/0146271 A1 | 7/2005 | Aoki et al. | 313/582 |
| 2007/0290623 A1 | 12/2007 | Saruta | 315/169.2 |
| 2007/0296344 A1 | 12/2007 | Saruta | 315/169.2 |

FOREIGN PATENT DOCUMENTS

| | | |
|---|---|---|
| CN | 1494729 A | 5/2004 |
| EP | 1 353 354 A1 | 10/2003 |
| JP | 10-195428 | 7/1998 |
| JP | 2002-265942 | 9/2002 |
| JP | 2004-172091 | 6/2004 |
| JP | 2004-175786 | 6/2004 |
| JP | 2004-176010 | 6/2004 |
| JP | 2004-231930 | 8/2004 |
| JP | 2004-307869 | 11/2004 |
| JP | 2004-352936 | 12/2004 |

* cited by examiner

*Primary Examiner*—C. Melissa Koslow
(74) *Attorney, Agent, or Firm*—Fitzpatrick, Cella, Harper & Scinto

(57) ABSTRACT

A phosphor represented by a general formula: $M1_xM2_{2-x}Si_2O_6Ra_z$ ... (1) wherein, M1 and M2 are alkaline earth metals, x<2, Ra is Ce or Eu and $0.005 \leq z \leq 0.05$), and wherein a variation of y-value of CIE chromaticity relative to the quantity of charge applied per unit area is $dy/dQ \leq 0.0001$ and the y-value of CIE chromaticity is $y \leq 0.080$.

2 Claims, 6 Drawing Sheets

R: RED PHOSPHOR
G: GREEN PHOSPHOR
B: BLUE PHOSPHOR

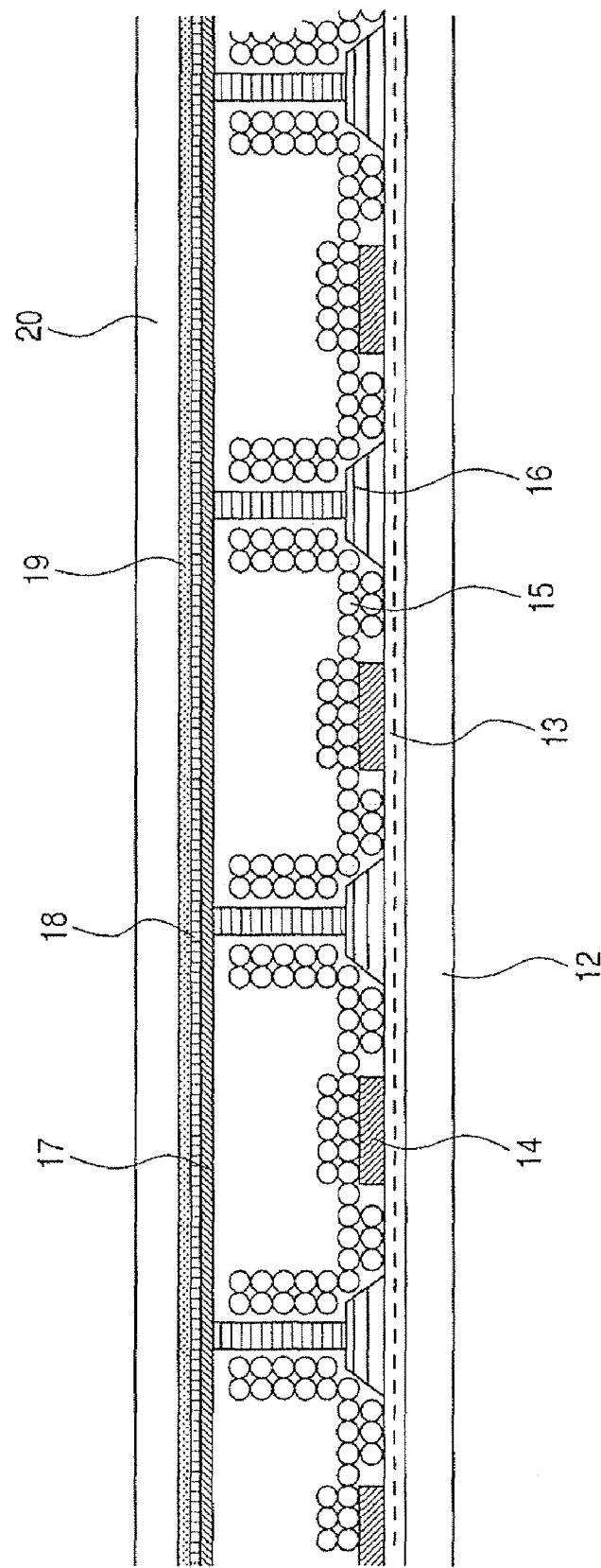

BLUE PHOSPHOR AND DISPLAY PANEL USING THE SAME

BACKGROUND OF THE INVENTION

1. Field of the Invention

The present invention relates to a blue phosphor and a display panel using the same.

2. Description of the Related Art

An image display apparatus using the light emission of a phosphor is a self-emission type of light, superior in color reproducibility, high in luminance and excellent in moving image display characteristic. Such an image display apparatus has been practically widely applied as a cathode ray tube (hereinafter referred to as CRT) in the industry. In recent years there has been demand for the image display apparatus to meet the requirements for further increase of performance, size, picture quality and saving of energy and space according as image information is diversified and density is increased. Under such circumstances, there are growing expectations for the image display apparatus as a flat panel display (hereinafter referred to as FPD) which is a self-emission type of light, such as a plasma display panel (hereinafter referred to as PDP) and a field emission display panel (hereinafter referred to as FED).

A thin film transistor driven liquid crystal display device (hereinafter referred to as TFT) has already been practically applied as a FPD and has replaced a part of the market which the CRT has dominated heretofore because of its excellent characteristics such as wide color reproducibility, high luminance and long lifetime. The TFT which is not a self-emission type of light may produce an unavoidable problem with the performances of image formation such as a narrow angle of field, inferior moving image visibility and fading of a black color caused by having to use a backlight light source. Although the TFT features a low consumption power as far as it is small in size, which can be distinguished from other FPDs, the FPD has required a large consumption power for a backlight light source according as a screen size increases and has now had a problem with a high consumption power.

As described above, the FPD has problems difficult to solve in a full-scale diffusion. The FED is one of systems drawing attention as the FPD to solve the above problems.

The structure of the FED is described in brief below. Devices used as electron emitting sources are arranged in a matrix correspondingly to each pixel over a rear plate. Wirings for driving a multiplicity of the devices are arranged in a matrix. The electron sources now proposed as many embodiments include a cathode chip having three-dimensional structure like Spindt type, flat shaped type, and carbon nanotube type. The application of a voltage to these electron sources in vacuum through the wirings according to image information causes the electron sources to emit electron beams according to image information.

A face plate includes a layer formed by phosphors which emit light by an excitation source of accelerated electron beams. A high voltage is applied across the rear and the face plate to accelerate electron beams emitted from the electron source to provide the phosphors with a required excitation energy, thereby enabling forming images according to image information.

The face plate needs to efficiently remove electric charges accumulated on the phosphor layer of a substantially insulating material to efficiently reflect light emitted from the phosphor. For this reason, a metallic film called a metal back with a small atomic number such as aluminum is generally provided over the phosphor layer. Incidentally, the FED which is used in a low accelerated voltage area creates a problem with energy loss caused by the metallic film, so that an electroconductive transparent film such as indium tin oxide can be formed on the face plate.

The FED needs to be a vessel with a high vacuum of at least about $10^{-4}$ Pa because it is driven by the foregoing mechanism. For this reason, in general, a frame with an adequate thickness is interposed between the face plate and the rear plate, a plurality of components called a spacer is arranged between the plates to maintain the shape of the vessel against the atmospheric pressure and the components are bonded. Air is evacuated from the vessel to produce the vacuum vessel. The spacer is typically arranged between adjacent pixels of phosphors, or over a non-light emission black area (or a black matrix) provided to suppress the reflection of external light. In general, it is necessary to arrange a sufficient number of the spacers to support the vessel against the atmospheric pressure.

In the FED which features flat type, the space between the cathode substrate of the electron source and the anode of the front plate is typically limited to several mm, so that an accelerating voltage of as high as 25 kV cannot be used unlike CRT because of limitations of voltage endurance. In even a high-voltage type FED, an accelerating voltage is limited to 15 kV or lower. For this reason, the penetration depth of an exciting electron to the phosphor layer is inevitably shorter than that in the CRT. It is typically indispensable to use a high current density or a line sequential driving to realize a practically usable luminance equivalent to that of the CRT.

This requires a phosphor to secure luminance linearity at a high current area as well as high light emission efficiency and provide stability in luminance for electric charges applied. Furthermore, the phosphor is required to exhibit light emission high in color purity to realize a high level display device. Only a group of zinc sulfide phosphor called EIA P22 which has long been used in the CRT is known as electron beam excitation phosphor which has been practically used.

The zinc sulfide phosphor is not always sufficient in stability for electric charges applied and the time degradation in luminance is further conspicuous in the FED which is operated at a higher current area than the CRT. In addition, various problems are caused in that sulfur dissociated by thermal energy produced by applied electric charges is dispersed into the vacuum vessel to decrease degree of vacuum and exert an adverse influence on the electron source.

The above problem is particularly conspicuous in a blue phosphor ZnS:Ag which requires the highest current to obtain sufficient visual light-emission efficiency.

To tackle these problems, Japanese Patent Application Laid-Open No. 2002-265942 discloses a method of producing zinc sulfide phosphor with a little crystal defect and Japanese Patent Application Laid-Open No. 2004-307869 also discloses a process for correcting the crystal defect and surface strained layer of zinc sulfide phosphor. These proposals have provided improvements to some extent.

However, the zinc sulfide phosphor has an unavoidable problem in that a luminance linearity deteriorates at a high current area in addition to the problem with instability for applied electric charges. This is because light emission mechanism in the zinc sulfide phosphor is a second-order reaction referred to as "donor-acceptor pair light emission type" and the concentration of donor and acceptor cannot be sufficiently increased because of the problem with concentration quenching. This drawback in that attenuation time is slow is disadvantageous to high-definition vertical line driving adapted to HDTV, so that it needs to be solved.

As stated above, there have been intense demands for the development of an electron beam excited blue phosphor to be possibly substituted for the zinc sulfide phosphor and, in particular, the invention of a phosphor with non sulfide as host and 4f5d type allowed-transition luminescent center faster in attenuation time. Phosphors except the zinc sulfide phosphor have been researched so far. For example, phosphor $Y_2SiO_5$:$Ce^{3+}$ has a 4f5d type allowed-transition luminescent center in its oxide host used as special electron tube such as beam indexing tube for electron beam excitation. However, the phosphor has a drawback in that the half width of spectrum thereof is wider, so that it cannot emit sufficiently pure blue.

On the other hand, the PDP is a prospective display as the next generation FPD as well as the FED. The blue phosphor practically used in the PDP at present is only aluminate phosphor of alkaline earth metal, specifically, phosphor $BaMgAl_{16}O_{27}$:Eu (BAM). The phosphor emits blue light high in luminance and excellent in color purity by vacuum ultraviolet-ray excitation, but has a serious problem with deterioration during PDP panel production process and inferiority in driving durability. For this reason, there has been a demand for the invention of a phosphor substituted for the BAM. Japanese Patent Application Laid-Open No. 2004-175786 proposes improvement on decrease in crystal defect of the BAM phosphor. Japanese Patent Application Laid-Open No. 2004-172091 proposes improvement on change of electrification characteristic of the BAM phosphor surface. In addition, for example, improvements by adding additive to the BAM phosphor have been proposed. However, the above improvements have not obtained sufficient effect. Other phosphors need to be invented.

A phosphor represented by a general formula (1):

(1)

(where, M1 and M2 are alkaline earth metal, x is smaller than 2, Ra is Ce or Eu and $0.005 \leq z \leq 0.05$), in particular, a phosphor $CaMgSi_2O_6$ emits light with a narrow half width having 449 nm at its central peak, emits blue light excellent in color purity and is superior in process resistance and driving durability. For this reason, the phosphor $CaMgSi_2O_6$:Eu has availability as a new blue phosphor for the PDP panel capable of replacing the BAM phosphor. However, on the contrary, the phosphor has a problem in that a visual luminance cannot be sufficiently increased because of its high color purity, which urges further improvement in luminance.

Japanese Patent Application Laid-Open No. 2004-231930 attempts improvements in luminance by optimizing the grain size and halogen component having a fusing agent effect. Japanese Patent Application Laid-Open No. 2004-352936 also attempts improvements in luminance by improving baking process and Japanese Patent Application Laid-Open No. 2004-176010 attempts improvements in luminance by optimizing stoichiometric composition. Furthermore, an attempt has been made to improve the absorption in a VUV area by adding a sensitizer. None of them has obtained sufficient effect.

Thus, in the FPD such as FED and PDP, a blue phosphor needs to be invented, excellent in color purity, high in luminance and superior in durability.

SUMMARY OF THE INVENTION

The present invention has for its purpose to provide a phosphor suitably applicable to a blue phosphor for a self-emission image display apparatus for various fields, and in particular, for FED and PDP.

The present invention provides a phosphor represented by a general formula:

(1)

wherein M1 and M2 are alkaline earth metals, x<2, Ra is Ce or Eu and $0.005 \leq z \leq 0.05$), and wherein a variation of y-value of CIE chromaticity relative to the quantity of charge applied per unit area is $dy/dQ \leq 0.0001$ and the y-value of CIE chromaticity is $y \leq 0.080$.

Further, features of the present invention will become apparent from the following description of exemplary embodiments with reference to the attached drawings.

BRIEF DESCRIPTION OF THE DRAWINGS

FIG. 4 is a partial cross section illustrating the structure of one example of a plasma display.

DESCRIPTION OF THE EMBODIMENTS

Figure 1:
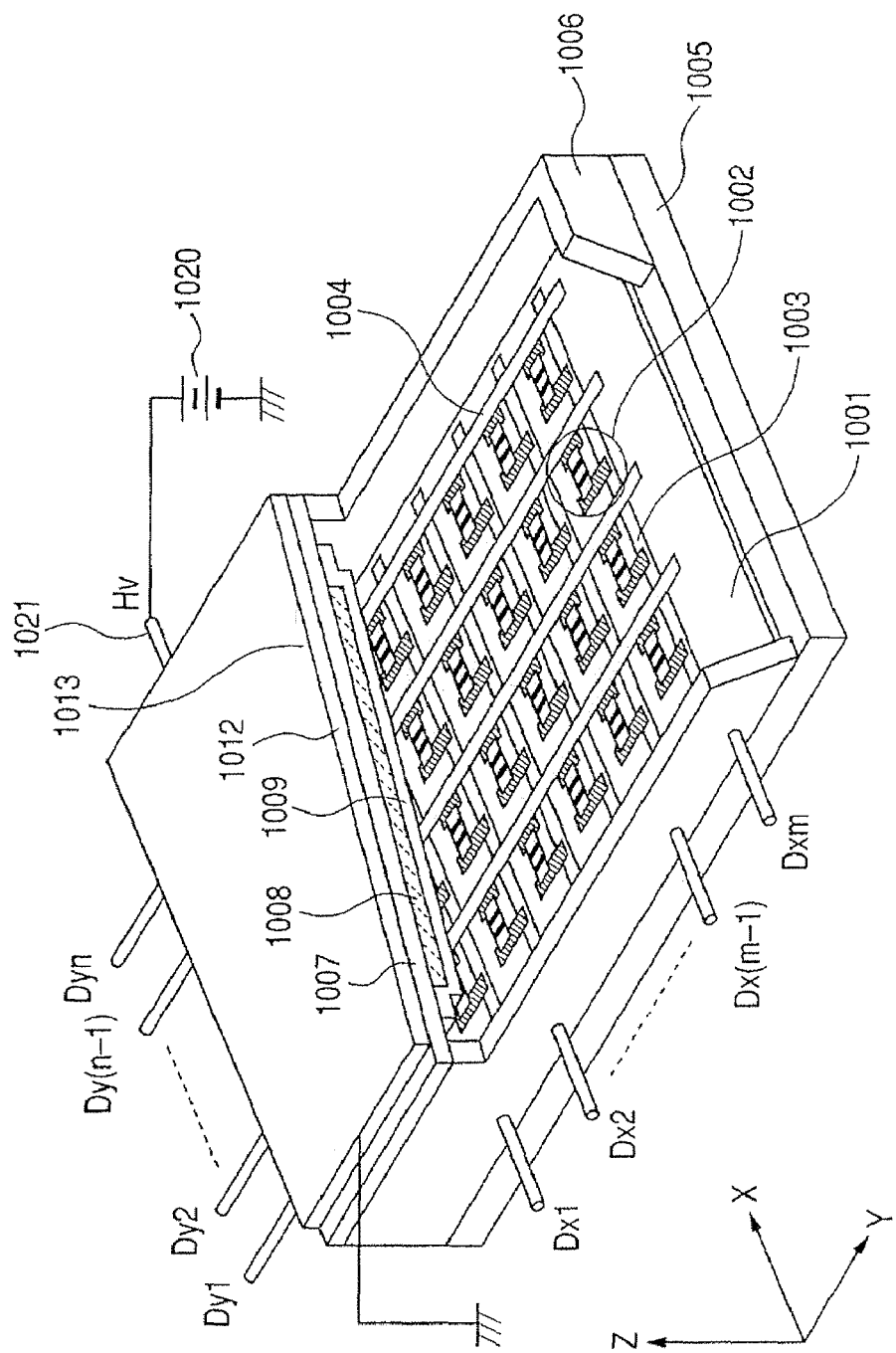
FIG. 1 is a perspective view of structure of one example of a flat panel display, with a part thereof broken away.

A phosphor according to the present invention is characterized by including one represented by a general formula (1):

(1)

(where, M1 and M2 are alkaline earth metal, x<2, Ra is Ce or Eu and $0.005 \leq z \leq 0.05$), and in that the variation of y-value of CIE chromaticity relative to the quantity of charge applied per unit area is $dy/dQ \leq 0.0001$ and the y-value of CIE chromaticity is $y \leq 0.080$.

A field emission display panel and plasma display panel of the present invention are characterized by including the above phosphor.

The present invention can provide a phosphor capable of stably emitting blue light good in color purity.

The phosphor which uses the 4f5d type allowed-transition of rare earth elements such as $Eu^{2+}$ or $Ce^{3+}$ as a luminescent center exhibits emission spectrum superposed on two proximate levels resulting from the weak split of an orbit f of an inner shell caused by spin orbit interaction. For this reason, the spectrum shows an asymmetric shape having a tail portion trailing toward the long wavelength side because the peak on the short wavelength side (or, on the high energy side) is strong.

Providing energy of an exciting source such as ultraviolet ray or electron beam for the phosphor with the rare earth $Eu^{2+}$ or $Ce^{3+}$ as a luminescent center enables the phosphor to emit light extremely fast in attenuation and high in luminance, however the tail portion on the long wavelength side of spectrum tends to increase as time elapses. The reason the tendency appears has been theoretically unsupported. Difference cannot be identified by structural analysis with powder X-ray diffraction and by qualitative and quantitative analysis with emission spectroscopy. The reason seems to be attributed to change in minute structural stable state in the crystal lattice of luminescent center existing as impurities.

When the central peak of the light emission exists in the area high in luminosity or in the vicinity of 500 nm to 600 nm or more, change in chromaticity luminance cannot be observed because the increment on the long wavelength side is an area weak in luminosity. However, the position of the central peak of a blue or blue-green emission with its peak wavelength of 480 nm or less is relatively insusceptible to luminosity, on the contrary, the increment on the long wavelength side is superposed on the peak position of luminosity to increase contribution. This increases the y-value. At this point, overlap integral with a standard luminous efficiency curve also increases to naturally raise luminance.

On the other hand, the phosphor represented by the general formula (1) emits light high in luminance and excellent in color purity. As stated earlier, the phosphor is irradiated with ultraviolet ray or electron beam to increase the y-value of chromaticity according to the quantity of irradiation, whereby increasing luminance. The increase tends to be saturated in due course. When the variation of the y-value relative to the quantity of charge applied is saturated to $dy/dQ \leq 0.0001$ at the time of applying electron beams, the y-value of CIE chromaticity at this saturation point is $y \leq 0.080$, which proved that even the y-value obtained after the increase showed blue good in color purity sufficiently close to the NTSC color. At this point, the integral of product of the spectrum and the standard luminous efficiency curve is increased to improve luminance by about 1.5 times.

That is to say, the phosphor is irradiated with ultraviolet ray or electron beam in advance as described above to enable providing the blue phosphor high in luminance and color purity.

Thus, the use of the phosphor in which the increase of the y-value relative to the quantity of charge applied is saturated and its color purity lies within the above range can provide the blue good in color purity and small in color change and an FED panel wide in color reproducible range and high in luminance. Furthermore, the use of the phosphor can provide the blue good in color purity, high in luminance and small in color secular change and a PDP panel wide in color reproducible range and high in luminance.

In the above views, the phosphor represented by the general formula (1) has availability as a new blue phosphor for a PDP panel capable of replacing the BAM phosphor.

However, on the contrary, the phosphor has a problem in that a visual luminance cannot be sufficiently increased because of its high color purity. The present inventors' experiments revealed that the phosphor irradiated and excited with ultraviolet ray or electron beam increased the y-value of chromaticity according to the quantity of irradiation, whereby increasing luminance. The increase in the y-value is caused by increase in the tail portion on the long wavelength side of the emission spectrum and caused because the increased portion is close to the peak portion of the standard luminous efficiency curve in the blue phosphor with a peak wavelength of 460 nm or less. The increase tends to be gradually saturated.

When the phosphor is irradiated and excited with electron beams and even when the variation of the y-value relative to the quantity of charge applied is saturated to $dy/dQ \leq 0.0001$, the phosphor represented by the general formula (1), in particular, the phosphor $CaMgSi_2O_6$:Eu is good in initial color purity and the y-value of CIE chromaticity is sufficiently as low as 0.040 to 0.044. The y-value of CIE chromaticity at the saturation point lies in $0.055 \leq y \leq 0.080$. In addition, it was found that the y-value reached $dy/dQ \leq 0.0001$ was a blue emission good in color purity and close enough to the NTSC color. At this point, the integral of product of the spectrum and the standard luminous efficiency curve was increased to improve luminance by 1.3 to 1.5 times, thereby enabling providing the blue phosphor high in luminance.

If z in the general formula (1) is smaller than 0.005, luminance is lowered. If z is greater than 0.05, concentration quenching is caused to lower luminance, which is not preferable.

If dy/dQ is greater than 0.0001, the variation of the y-value relative to exciting energy applied thereafter is excessively large to lead to secular change in color, which is not preferable. The y-value at $dy/dQ \leq 0.0001$ needs to be 0.080 or less.

The y-value increases until it exceeds a region of 0.055 without being saturated, however, it does not satisfy the y-value of NTSC blue at y>0.080 to degrade color purity, which is not preferable.

For the alkaline earth metal M1 and M2 in the phosphor represented by the general formula (1) of the present invention, as mentioned earlier, the highest luminance in electron beam excitation is obtained when Ca and Mg are used as M1 and M2 respectively and M1:M2=1:1, or x=1. In addition, the above embodiment presents blue emission with its central peak at 449 nm, excellent in color purity and narrow in half width, which is the most preferable embodiment. If x is not 1, luminance in electron beam excitation is lowered, however, the same effect as described in the present specification can be obtained.

On the other hand, if M1=M2=Ca, emission color is changed to green. In this case, the y-value exceeds 0.008, which cannot produce the effect aimed by the present invention. If M1=M2=Mg, a sufficient luminance in electron beam excitation may not be obtained, which is not preferable. Therefore, x needs to be smaller than 2.

If M1=Ba, and M2=Mg, blue emission having its central peak at around 450 nm can be obtained, which possibly produces the effect aimed by the present invention, however, luminance in electron beam excitation is lower compared with the case where M1=Ca. If M1=Sr, blue-green emission having its central peak at around 470 nm to 480 nm can be obtained, the case where M1=Ca is more preferable in terms of color purity.

The phosphor of the present invention can be obtained by subjecting the raw material phosphor with composition represented by the general formula (1) to an excitation process by the irradiation of activation energy beams to obtain a predetermined "dy/dQ" and "the y-value of CIE chromaticity." Various methods may be used as the excitation process.

The best excitation process in the present invention is carried out in such a manner that a raw material phosphor in the powder state is placed on a tray of alumina or silicon nitride and introduced into a vacuum chamber provided with a large current electron gun, air is sufficiently evacuated from the chamber and the phosphor is applied with electron beams by the large current electron gun.

When the process is finished within a reasonable time, the electron gun needs to have a beam spot diameter of about 2 mm or more, a beam current density of 0.1 mA/cm$^2$ or more and an electrostatic deflection system capable of scanning a comparatively wider area.

The degree of vacuum in the processing chamber needs to be $10^{-6}$ Pa or less to prevent carbon from being evaporated on the phosphor by applying electron beams.

The phosphor powder thus processed is taken out of the chamber and incorporated into a PDP by using such a known method as proposed in Japanese Patent Application Laid-Open No. H10-195428, thereby allowing producing the PDP using the phosphor according to the present invention.

The phosphor obtained in the same method is incorporated into an FED using a known method to produce the FED.

The ultraviolet-ray irradiation method may be used for excitation process for phosphor. In this method, phosphor powder is directly irradiated with ultraviolet ray using a large power Xe flash lamp. Specifically, a large power Xe flash lamp with a large energy density of 10 J/cm$^2$ or more is used, the upper part of which is covered with a reflective plate to improve an irradiation efficiency. A tray of alumina or silicon nitride including the powder phosphor is arranged on the irradiation side to irradiate it with ultraviolet ray. In this case, care must be taken about sudden rise in temperature caused by continuous ultraviolet-ray irradiation. Accordingly, for example, it is desirable that 100 μs to 1 ms pulsed ultraviolet ray is generated at a frequency of 60 Hz and used for irradiation at a relatively small duty ratio with care taken about rise in temperature.

One example of the PDP and FED to which the phosphor of the present invention can be applied is described hereinunder.

FIG. 1 is a perspective view of a flat panel display as the FED. A part of a display panel is broken away to show the inner structure thereof. In the figure, the flat panel display includes a rear plate 1005, side wall 1006 and face plate 1007. These members form a hermetical vessel to maintain vacuum inside of the display panel. The electron source of the flat panel display is not limited, provided that a surface conduction electron-emitting device, Spindt field emission device, MIM electron emitting device or the like are used in the flat panel display as an electron source. The electron source is desirably a surface conduction electron-emitting device which is simple in manufacture, high in luminance and suitable for a large area. The device illustrated in FIG. 1 uses the surface conduction electron-emitting device.

A substrate 1001 is fixed to the rear plate 1005. N×M surface conduction electron-emitting devices 1002 are formed over the substrate 1001 (where N and M are an integer of two or more and properly selected according to the number of display pixels to be targeted). The N×M surface conduction electron-emitting devices are wired by passive-matrix wiring using by M row-directional wirings 1003 and N column-directional wirings 1004. The part including 1001 to 1004 is referred to as "multiple electron source." The wirings 1003 are electrically connected to respective ones of lines Dx1 to Dxm, and the wirings 1004 are electrically connected to respective ones of lines Dy1 to Dyn.

In the present embodiment, although the substrate 1001 for the multiple electron source is fixed to the rear plate 1005 for the hermetical vessel, the substrate 1001 in itself for the multiple electron source may be used as the rear plate 1005.

Figure 2A:
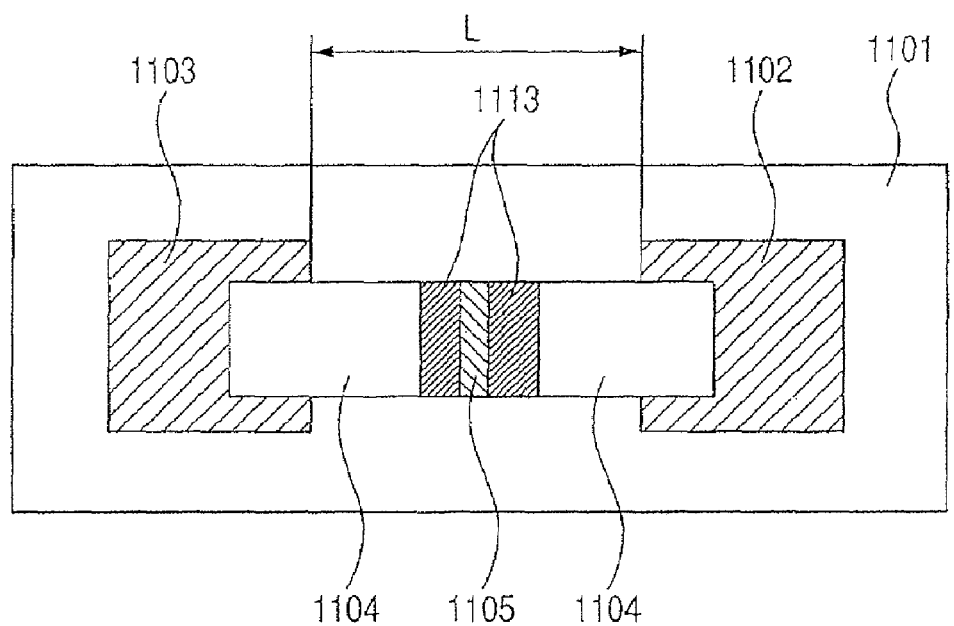
FIGS. 2A and 2B are a top view and cross section of structure of a surface conduction electron-emitting device respectively.
Figure 2B:
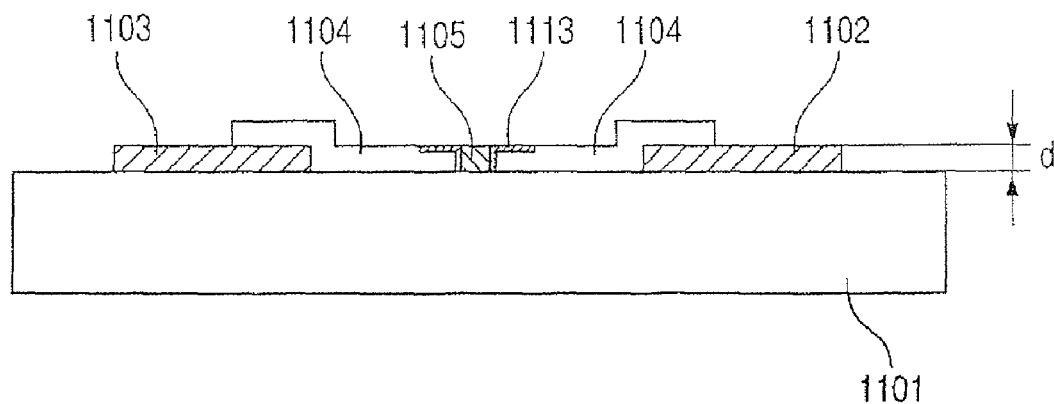

The structure of the surface conduction electron-emitting device is described below. FIGS. 2A and 2B are a top view and a cross section for describing the structure of the surface conduction electron-emitting device respectively. The surface conduction electron-emitting device includes a substrate 1101, device electrodes 1102 and 1103, electroconductive thin film 1104, electron emitting area 1105 formed through process of forming by energization and thin film 1113 formed through process of activation by energization. In the perspective represented in FIG. 2A, the electrodes 1102 and 1103 are separated by a distance L.

A transparent electroconductive film (not shown) is formed on the surface of the face plate 1007. A protective plate 1013 with an antistatic film 1012 is fixed over the transparent electroconductive film by a bonding layer (not shown). These components function to prevent electrification when the device is applied with a high voltage and it is not always limited to the above configuration if this function is provided.

A phosphor 1008 and a metal back 1009 are provided at the other side of the face plate. A high voltage is applied to the metal back 1009 of the face plate 1007 by a high voltage power supply 1020 through a high voltage input terminal 1021. The metal back 1009 may include a getter material.

Figure 3A:
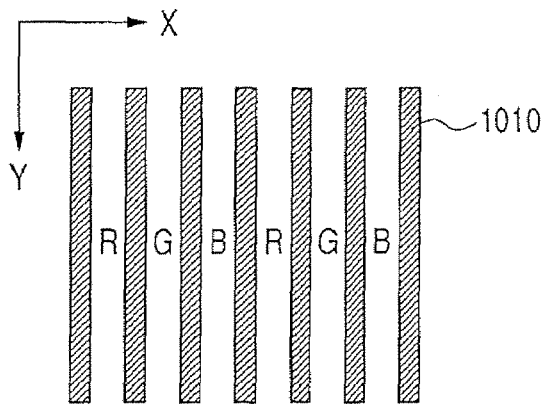
FIGS. 3A, 3B and 3C are top views illustrating the layout of phosphor of a face plate.
Figure 3B:
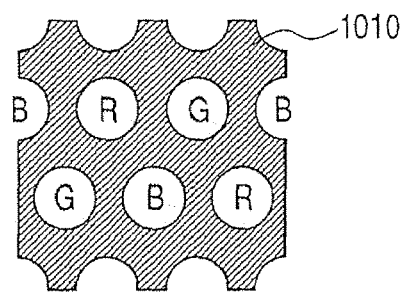
Figure 3C:
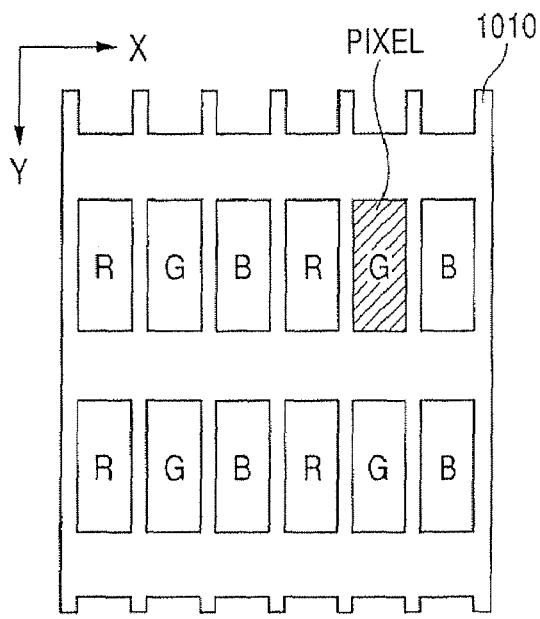

The phosphor 1008 is provided at the other side of the face plate 1007. The three primary color (red, green and blue) phosphors are separately applied on the part of the phosphor 1008. The phosphors of each color are separately applied though black stripes 1010 as illustrated in FIGS. 3A, 3B and 3C.

The phosphor of the present invention is used in a predetermined portion of the phosphor (layer) formed over the face plate to produce a flat panel display according to the present invention.

FIG. 4 is a partial cross section illustrating one example of the structure of a PDP. The PDP has a vacuum area between a front substrate 20 and a rear substrate 12. A rear dielectric layer 13, address electrode 14 and phosphor layer 15 are arranged over the rear substrate. A black matrix layer 17, transparent electrode 18 and transparent dielectric layer 19 are arranged under the front substrate. The pixels are partitioned with a rib 16. The phosphor of the present invention is used in a predetermined portion of the phosphor layer to obtain the PDP according to the present invention.

EMBODIMENTS

The present invention is described in detail with reference to a comparative example and specific embodiments hereinunder.

Comparative Example

Calcium carbonate of 6.7 g in weight (produced by Kishida Chemical Co., Ltd., guaranteed reagent), magnesium oxide of 2.7 g in weight (produced by Kishida Chemical Co., Ltd., guaranteed reagent), silicon oxide (IV) of 9.7 g in weight (produced by Kojundo Chemical Laboratory Co., Ltd.) and europium oxide (III) of 0.87 g in weight (produced by Kojundo Chemical Laboratory Co., Ltd.) were measured by a chemical balance. These materials are bug-mixed enough and thereafter sufficiently crushed using an agate mortar with acetone mixed with the materials and then dried at a temperature of 140° C. for one hour to produce a precursor before baking.

A 30-cc alumina crucible was filled with a 5-g precursor, introduced into a furnace in a high temperature atmosphere in which a 5% $H_2/N_2$ mixed gas flows at a flow rate of 0.3 L/min and baked at a temperature of 1250° C. for about 90 minutes. The gas was caused to continue to flow until temperature fell to 450° or lower and cooled to a normal temperature, thereafter the crucible was taken out of the furnace. The baked phosphor was taken out of the crucible through a nylon 100 mesh into 100-cc pure water to prevent the exfoliation of the crucible from being mixed into the phosphor.

Phosphor suspension in the pure water is sufficiently stirred with a magnetic stirrer and sedimented and then supernatant was removed. This cleaning process was repeated five times to remove an unwanted baking residue. The cleaned phosphor was filtrated using a Buchner funnel and an aspirator and dried at a temperature of 140° C. for five hours.

Finally, the phosphor was subjected to a vibrating screen with a SUS400 mesh to obtain a rare earth activated alkaline earth silicate phosphor $CaMgSi_2O_6:Eu_{0.04}$ having an appropriate grain size.

Figure 5:
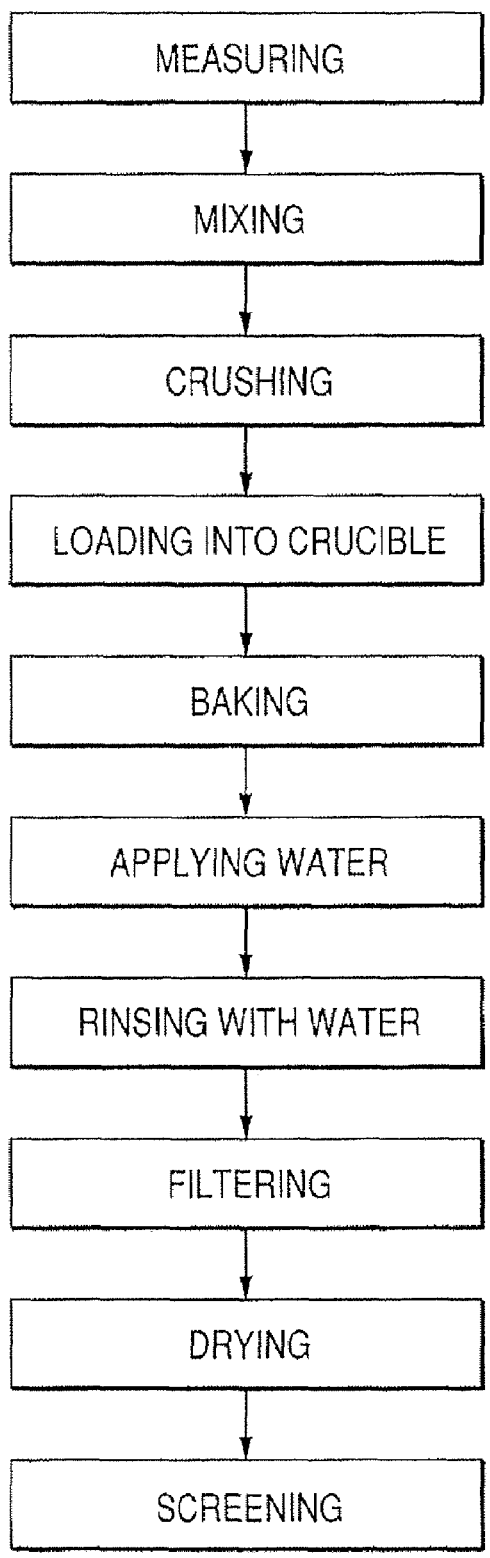
FIG. 5 is a flow chart for forming process of the phosphor.

FIG. 5 is a flow chart of the process described above.

Figure 6:
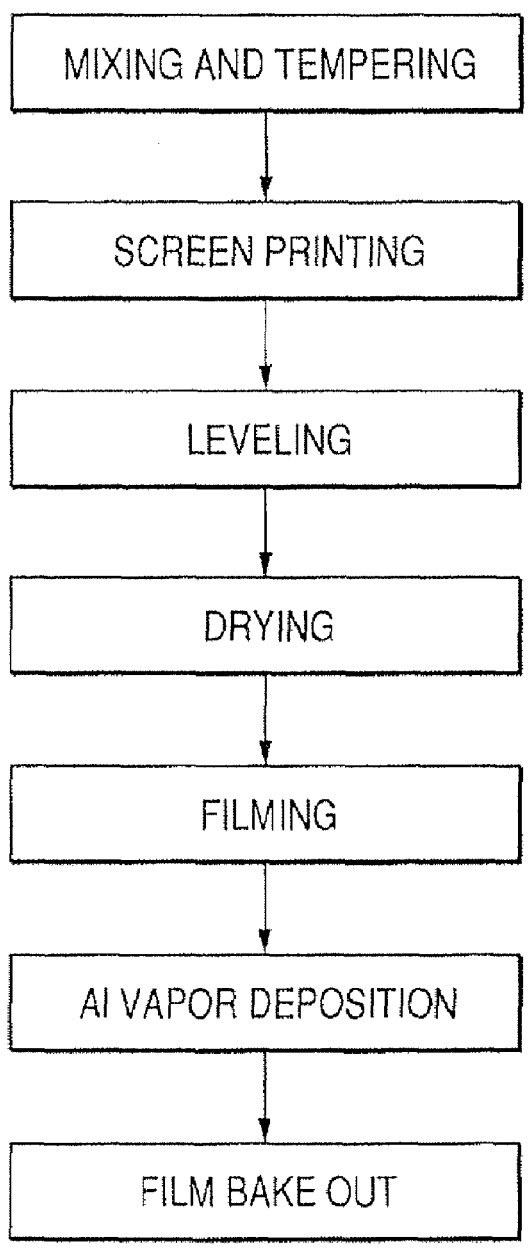
FIG. 6 is a flow chart for forming process of a phosphor substrate.

The phosphor thus obtained was dispersed into liquid mixture of terpine oil into which resin such as ethyl cellulose is dissolved to maintain a proper thixotropy and butylcarbitol acetate to obtain phosphor paste. Subsequently, a 80 mm×80 mm phosphor layer was printed and applied over a 100 mm×100 mm×2.8 mm glass substrate using the phosphor paste and an emulsion printing of 325 mesh. The layer was left for a proper time period after application to level the printed face and dried to obtain the phosphor layer. The substrate over which the phosphor layer was formed was attached to a spincoater and resin solution in which acrylic resin is dissolved into mixed solution of toluene and butylcarbitol acetate was spincoated to form a filming layer to maintain an appropriate viscosity. After a drying process has been finished, a 1000-Angstrom aluminum was evaporated on the filming layer by electron beams and finally baked at a temperature of 450° C. for one hour to obtain a phosphor substrate with aluminum back. FIG. 6 is a flow chart of the producing process for the phosphor substrate mentioned above.

A 2-mm thick glass frame was bonded around the phosphor substrate by frit, and a plurality of the electron sources arranged in a matrix and the rear substrate having wiring electrodes for driving the sources and an exhaust pipe are bonded by frit to obtain a hermetic vessel. The hermetic vessel was connected to a vacuum gauge through the exhaust pipe thereof and heated to a temperature of 300° C. and then air was evacuated enough to $10^{-7}$ Pa or less. In this state, the exhaust pipe is fused to obtain the FED panel of a vacuum vessel.

An appropriate driving voltage was applied to the FED panel thus obtained. Electron beams with a current density of 0.02 A/cm$^2$ were driven by a rectangular wave with 60 Hz and 20 μs. In addition, the application of an accelerating voltage of 10000 V caused the phosphor to emit light. Luminance and chromaticity were measured by a radiance meter TOPCON SR-3. At this point, luminance was 100 and measured y-value of chromaticity was 0.042.

When the phosphor was caused to continue to emit light for 116 hours under the same condition, the quantity of charge applied to the phosphor was Q=10 C/cm$^2$ and the y-value was 0.055, so that the difference of the y-value relative to the initial value was Δy=0.013 to provide dy/dQ=0.0013.

First Embodiment

A 25-g phosphor obtained by the same method as in the comparative example was placed on an alumina tray and set inside the same vacuum chamber provided with a large current electron gun as in the detailed description of the embodiment of the present invention before comparative example. Pressure inside the chamber was reduced to 1×10$^{-7}$ Pa or less. A small current was caused to flow into a filament with a 40-kV accelerating voltage applied across the electron gun and the aluminum back of the phosphor substrate. A 3-mm diameter converged electron beam was applied to the phosphor applied portion. A scanning signal was applied to the deflecting electrode of the beam to perform a raster application to cover all over the area where the phosphor was applied. Finally, a filament current was gradually increased to such an extent that a current density of the phosphor substrate reached 0.05 A/cm$^2$. In this state, electron beams were applied for 80 hours. After that, the chamber was purged by N$_2$ gas and the alumina tray including the phosphor was taken out of the chamber.

The FED panel obtained using the phosphor by the same method as in the comparative example was lighted under the same condition as in the comparative example. The luminance was 1.437 times as high as that in the comparative example. The y-value of chromaticity was 0.058.

The y-value was 0.0583 for the case where a quantity of charge of Q=10 C/cm$^2$ was continuously applied to the phosphor for 116 hours under the same condition, which provided blue better than the NTSC. Furthermore, Δy obtained was 0.00087 and dy/dQ was 0.000087, which produced little color shift caused by driving.

Second Embodiment

A 25-g phosphor obtained by the same method as in the comparative example was placed on an alumina tray and set inside the same vacuum chamber provided with a large current electron gun as the detailed description of the embodiment of the present invention before comparative example. Pressure inside the chamber was reduced to 1×10$^{-7}$ Pa or less. A small current was caused to flow into a filament with a 40-kV accelerating voltage applied across the electron gun and the aluminum back of the phosphor substrate. A 3-mm diameter converged electron beam was applied to the phosphor applied portion. A scanning signal was applied to the deflecting electrode of the beam to perform a raster application to cover all over the area where the phosphor was applied. Finally, a filament current was gradually increased to such an extent that a current density of the phosphor substrate reached 0.05 A/cm$^2$. In this state, electron beams were applied for about 107 hours. After that, the chamber was purged by N$_2$ gas and the alumina tray including the phosphor was taken out of the chamber.

The FED panel obtained using the phosphor by the same method as in the comparative example was lighted under the same condition as in the comparative example. The luminance was 1.458 times as high as that in the comparative example. The y-value of chromaticity was 0.0592.

The y-value was 0.0598 for the case where a quantity of charge of Q=10 C/cm$^2$ was continuously applied to the phosphor for 116 hours under the same condition, which provided blue better than the NTSC. Furthermore, Δy obtained was 0.00067 and dy/dQ was 0.000067, which produced little color shift caused by driving.

Third Embodiment

A 25-g phosphor obtained by the same method as in the comparative example was placed on an alumina tray and set inside the same vacuum chamber provided with a large current electron gun as in the detailed description of the embodiment of the present invention before comparative example. Pressure inside the chamber was reduced to 1×10$^{-7}$ Pa or less. A small current was caused to flow into a filament with a 40-kV accelerating voltage applied across the electron gun and the aluminum back of the phosphor substrate. A 3-mm diameter converged electron beam was applied to the phosphor applied portion. A scanning signal was applied to the deflecting electrode of the beam to perform a raster application to cover all over the area where the phosphor was applied. Finally, a filament current was gradually increased to such an extent that a current density of the phosphor substrate reached 0.05 A/cm$^2$. In this state, electron beams were applied for about 133 hours. After that, the chamber was purged by N$_2$ gas and the alumina tray including the phosphor was taken out of the chamber.

The FED panel obtained using the phosphor by the same method as in the comparative example was lighted under the same condition as in the comparative example. The luminance was 1.477 times as high as that in the comparative example. The y-value of chromaticity was 0.0598.

The y-value was 0.0600 for the case where a quantity of charge of $Q=10$ C/cm$^2$ was continuously applied to the phosphor for 116 hours under the same condition, which provided blue better than the NTSC. Furthermore, Δy obtained was 0.00017 and dy/dQ was 0.000017, which produced little color shift caused by driving.

Table 1 lists the results obtained from the comparative example and the first to the third embodiments. As can be seen from Table 1, the phosphor according to the present invention is good in color purity within the NTSC range, high in luminance and has a small color shift caused by driving. The evaluated phosphor substrates in the comparative example and the first to the third embodiments were collected and the phosphor powders were collected as required to perform an elemental analysis thereof by emission spectral analysis. Table 2 lists the results of the elemental analysis. As is clear from Table 2, there is little significant difference between the results.

The evaluated phosphor substrates in the comparative example and the first to the third embodiments were collected and the phosphor powders were collected as required to perform a powder X-ray diffraction. Table 3 lists the results of the powder X-ray diffraction. As can be seen from Table 3, there is little significant difference in major diffraction peak intensity and half width in the comparative example and the first to the third embodiments.

TABLE 1

| | Time (h) | Quantity of charge (C/cm$^2$) | Luminance (%) | y | dy/dQ |
|---|---|---|---|---|---|
| Com. Ex. | 0 | 0 | 100 | 0.0420 | — |
| | 116 | 10 | — | 0.0550 | 0.001300 |
| Ex. 1 | 0 | 0 | 143.7 | 0.0580 | — |
| | 116 | 10 | — | 0.0583 | 0.000087 |
| Ex. 2 | 0 | 0 | 145.8 | 0.0592 | — |
| | 116 | 10 | — | 0.0598 | 0.000067 |
| Ex. 3 | 0 | 0 | 147.7 | 0.0598 | — |
| | 116 | 10 | — | 0.0600 | 0.000017 |

Note:
The percentage in the luminance for each of embodiments is denoted when the percentage in luminance based on the comparative example is taken as 100%.

TABLE 2

| | Time (h) | Quantity of charge (C/cm$^2$) | Results of elemental analysis (wt %) | | | |
|---|---|---|---|---|---|---|
| | | | Ca | Mg | Si | Eu |
| Com. Ex. | 0 | 0 | 17.2 | 10.5 | 24.2 | 2.6 |
| | 116 | 10 | 17.2 | 10.4 | 24.3 | 2.6 |
| Ex. 1 | 0 | 0 | 17.1 | 10.4 | 24.1 | 2.6 |
| | 116 | 10 | 17.1 | 10.4 | 24.2 | 2.6 |
| Ex. 2 | 0 | 0 | 17.2 | 10.3 | 24.2 | 2.6 |
| | 116 | 10 | 17.2 | 10.6 | 24.2 | 2.6 |
| Ex. 3 | 0 | 0 | 17.3 | 10.4 | 24.2 | 2.6 |
| | 116 | 10 | 17.2 | 10.4 | 24.3 | 2.6 |

TABLE 3

| | Time (h) | Quantity of charge (C/cm$^2$) | θ = 27.5 | | θ = 29.8 | | θ = 30.8 | | θ = 35.7 | |
|---|---|---|---|---|---|---|---|---|---|---|
| | | | Peak | Half width | Peak | Half width | Peak | Half width | peak | Half width |
| Com. Ex. | 0 | 0 | 3662 | 4.0 | 11037 | 4.1 | 4504 | 3.7 | 6188 | 3.4 |
| | 116 | 10 | 3657 | 4.1 | 10935 | 4.1 | 4509 | 3.6 | 6188 | 3.6 |
| Ex. 1 | 0 | 0 | 3644 | 4.2 | 10952 | 4.1 | 4516 | 3.5 | 6124 | 3.6 |
| | 116 | 10 | 3651 | 3.9 | 11051 | 3.9 | 4508 | 3.6 | 6122 | 3.6 |
| Ex. 2 | 0 | 0 | 3657 | 4.1 | 11001 | 4.0 | 4499 | 3.5 | 6121 | 3.6 |
| | 116 | 10 | 3654 | 4.0 | 10909 | 3.9 | 4503 | 3.7 | 6188 | 3.7 |
| Ex. 3 | 0 | 0 | 3653 | 4.0 | 10959 | 4.0 | 4502 | 3.5 | 6187 | 3.5 |
| | 116 | 10 | 3645 | 3.9 | 11012 | 3.9 | 4506 | 3.5 | 6122 | 3.4 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-140879, filed May 19, 2006, which is hereby incorporated by reference herein in its entirety.

What is claimed is:

1. A field emission display panel comprising a phosphor, wherein the phosphor is represented by a general formula $$M1_xM2_{2-x}Si_2O_6Ra_z \qquad (1)$$

wherein, M1 and M2 are alkaline earth metals, x<2, Ra is Ce or Eu and $0.005 \leq z \leq 0.05$), and wherein a variation of y-value of CIE chromaticity relative to the quantity of charge applied per unit area is dy/dQ≦0.0001 and the y-value of CIE chromaticity is y≦0.080.

2. A plasma display panel comprising a phosphor, wherein the phosphor is represented by a general formula $$M1_xM2_{2-x}Si_2O_6Ra_z \qquad (1)$$

wherein, M1 and M2 are alkaline earth metals, x<2, Ra is CE or EU and $0.005 \leq z \leq 0.05$), and wherein a variation of y-value of CIE chromaticity relative to the quantity of charge applied per unit area is dy/dQ≦0.0001 and the y-value of CIE chromaticity is y≦0.080.

* * * * *